(12) United States Patent
Quaranta

(10) Patent No.: US 10,843,810 B2
(45) Date of Patent: Nov. 24, 2020

(54) METHOD AND A SYSTEM FOR ANTICIPATING THE ENTRY OF A ROTORCRAFT INTO A VORTEX DOMAIN

(71) Applicant: AIRBUS HELICOPTERS, Marignane (FR)

(72) Inventor: Hugo Quaranta, Montrouge (FR)

(73) Assignee: AIRBUS HELICOPTERS, Marignane (FR)

( * ) Notice: Subject to any disclaimer, the term of this patent is extended or adjusted under 35 U.S.C. 154(b) by 300 days.

(21) Appl. No.: 15/987,284

(22) Filed: May 23, 2018

(65) Prior Publication Data

US 2018/0339791 A1    Nov. 29, 2018

(30) Foreign Application Priority Data

May 24, 2017    (FR) ...................................... 17 70526

(51) Int. Cl.
*B64D 45/00*   (2006.01)
*B64C 27/00*   (2006.01)

(52) U.S. Cl.
CPC ............ *B64D 45/00* (2013.01); *B64C 27/006* (2013.01); *B64D 2045/0085* (2013.01)

(58) Field of Classification Search
CPC ............ B64D 45/00; B64D 2045/0085; B64C 27/006
See application file for complete search history.

(56) References Cited

U.S. PATENT DOCUMENTS

| 5,562,414 | A | * | 10/1996 | Azuma | ................... B64C 23/06 244/1 N |
| 7,907,066 | B2 | | 3/2011 | Certain | |
| 8,843,252 | B2 | | 9/2014 | Eglin | |
| 9,037,316 | B2 | * | 5/2015 | Abildgaard | ............. G06F 17/00 701/7 |

(Continued)

FOREIGN PATENT DOCUMENTS

| EP | 1950718 A1 | 7/2008 |
| EP | 2513732 A1 | 10/2012 |

(Continued)

OTHER PUBLICATIONS

European Search Report for European Application No. EP18164556, dated Aug. 23, 2018, 6 pages.

(Continued)

*Primary Examiner* — Mary Cheung
(74) *Attorney, Agent, or Firm* — Brooks Kushman P.C.

(57) ABSTRACT

A method and a system for anticipating entry of a rotorcraft into a vortex domain, the rotorcraft having a main rotor with blades. After previously determining a specific frequency characterizing the proximity of a vortex domain, measurements are acquired of at least one parameter serving to characterize variation of the flow of air in the environment of the main rotor. Thereafter, the measurements are analyzed in order to isolate frequencies characteristic of the variation of each parameter, and the presence of the specific frequency is detected among the characteristic frequencies. Where appropriate, an alarm can then be issued in order to inform a pilot of the rotorcraft of the proximity of the vortex domain.

20 Claims, 2 Drawing Sheets

(56) References Cited

U.S. PATENT DOCUMENTS

2009/0089006 A1* 4/2009 Certain ............... B64C 27/006
 702/144
2011/0295568 A1 12/2011 va der Wall
2017/0369181 A1 12/2017 Certain et al.

FOREIGN PATENT DOCUMENTS

| EP | 3263452 A1 | 1/2018 |
|---|---|---|
| FR | 2921635 A1 | 4/2009 |
| FR | 2978586 A1 | 2/2013 |
| WO | 2004101358 A2 | 11/2004 |
| WO | 2004101358 A3 | 11/2004 |
| WO | 2011100179 A1 | 8/2011 |
| WO | 2012007157 A1 | 1/2012 |

OTHER PUBLICATIONS

Oliver Westbrook-Netherton et al., "An Investigation into Predicting Vortex Ring State in Rotary Aircraft", Jul. 21, 2015, XP055437446, DOI: 10.13140/RG.2.1.2294.5122, URL: https://www.researchgate.net/profile/Oliver_Westbrook-Netherton/publication/280234195_An_Investigation_into_Predicting_Vortex_Ring_State_in_Rotary_Aircraft/links/55ae59af08aee0799220d932/An-Investigation-into-Predicting-Vortex-Ring-State-in-Rotary-Aircraft.pdf, 15 pages.
David J. Varnes, "Development of a Helicopter Vortex Ring State Warning System Through a Moving Map Display Computer", TH, Sep. 1999, XP009100651, pp. 82-97, 153 pages.
French Search Report for French Application No. FR1770526, Completed by the French Patent Office, dated Dec. 22, 2017, 8 pages.

* cited by examiner

METHOD AND A SYSTEM FOR ANTICIPATING THE ENTRY OF A ROTORCRAFT INTO A VORTEX DOMAIN

CROSS-REFERENCE TO RELATED APPLICATIONS

This application claims priority to French patent application No. FR 1770526 filed on May 24, 2017, the disclosure of which is incorporated in its entirety by reference herein.

BACKGROUND OF THE INVENTION

(1) Field of the Invention

The present invention relates to the field of assistance for piloting a rotorcraft, and in particular to assistance for monitoring the proximity of a flight domain generally referred to by the person skilled in the art by the term "vortex".

The present invention relates to a method and to a system for anticipating entry of a rotorcraft, in particular of the helicopter type, into a vortex domain.

More particularly, this anticipation method and system are for the purpose of alerting the pilot of the rotorcraft that the rotorcraft is close to or indeed approaching a vortex domain.

(2) Description of Related Art

A rotorcraft, also known as a "rotary-wing aircraft" has at least one main rotor with a substantially vertical axis that provides the rotorcraft at least with lift. The main rotor has blades that are driven with rotary motion. In the particular circumstance of a helicopter, the main rotor, driven by at least one engine, serves to provide both lift and propulsion.

Under such conditions, a rotorcraft can in principle perform three kinds of flight, ignoring particular stages such as takeoff, landing, and turning:
  vertical flight, ascending or descending;
  hovering flight, the rotorcraft being stationary; and
  flight in horizontal translation.

The invention relates to descending flight, and mainly during approach stages for the purpose of landing, and also to flight close to hovering flight.

Specifically, during descending flight, the flow of air generated by the main rotor differs depending on whether the rate of descent is rapid, moderate, or slow.

Rapid or moderate descending flights are generally under "non-powered" conditions. The necessary power is provided by the flow of air, and an overrunning clutch or "freewheel" interposed in the mechanical power transmission assembly allows the main rotor to rotate freely.

During rapid descent the rate of flow of air that is obtained corresponds to a windmill-brake, whereas for moderate descent, the flight corresponds to autorotation.

In contrast, slow descending flight corresponds to powered conditions, with the pilot causing the rotorcraft to descend and controlling its descent by varying the collective pitch of the blades of the main rotor.

The invention relates more specifically to slow descending flight of a rotorcraft, e.g. starting from a position of hovering flight, the descent possibly taking place purely vertically or else with a flight path having a steep slope, i.e. with little horizontal speed.

During slow descending flight, a wake, formed by the air flow, appears under the main rotor, thereby obliging bottom central streams of air to deflect downwards and top central streams of air to create a zone of turbulence towards the periphery of the blades. The air flow is then disturbed and peripheral vortices run the risk of growing and completely isolating the plane of the main rotor. This dangerous phenomenon is referred to as the "vortex-ring" state and generally leads to the rotorcraft losing lift and maneuverability.

Under such conditions, when a hovering rotorcraft begins to descend vertically, the air flow speeds reversing in direction runs the risk of preventing the air flow from passing through the main rotor, whether upwards or downwards. The blades then work in their own wash and the air forms a ring of turbulence around the main rotor. This vortex-ring state gives rise to dangerous vibration of the rotorcraft and runs the risk of control of the rotorcraft being lost.

The vortex ring generally develops at a vertical speed that is equal to about half the average induced speed during hovering flight outside the ground effect zone and at a speed of advance that is low or substantially zero, although it can also appear at a lower vertical speed. A major portion of the main rotor is then in a stall zone, with the various elements of the blades then working at an angle of incidence that is relatively large. If the rotorcraft is moving significantly in horizontal translation, then the wash from the main rotor is rejected rearwards, such that the vortex-ring state no longer occurs.

The vortex-ring state is to be feared since it isolates the rotorcraft from the mass of air in which it is traveling. The three main situations for entering into a vortex-ring state are as follows:
  hovering flight, with the vertical speed of the rotorcraft drifting in uncontrolled manner;
  approach stages for landing, where the vertical speed for which entry into a vortex-ring state is possible occurs, associated with an uncontrolled reduction in the speed of advance and/or with a tardy increase in the collective pitch of the blades of the main rotor, and thus of flying power; and
  uncontrolled stages of slowing down in order to perform hovering flight, e.g. in order to perform winching or resulting from bad weather conditions, with a tardy increase in the collective pitch of the blades of the main rotor.

A vortex domain is thus dangerous, but the pilot can escape from it by starting to move forwards in translation by modifying the longitudinal cyclic pitch of the blades of the main rotor. However, it can take quite a long time to exit a vortex-ring state.

Under most circumstances, entry into a vortex-ring state takes place at low altitude, and specifically the vertical speed of the rotorcraft and the time required to exit this vortex-ring state generally lead to the rotorcraft crashing. A vortex-ring state is somewhat equivalent to stalling as observed with airplanes.

In order to anticipate the risk of a rotorcraft entering into a vortex domain, there exist vortex alert methods and systems that warn the pilot that the aircraft is in the proximity of a vortex domain or is indeed in such a domain.

By way of example, Document EP 1 950 718 describes a system and a method for triggering an alert when firstly the speed of the tail wind to which the rotorcraft is subjected is greater than a first threshold determined as a function of the height of the rotorcraft relative to the surface, and secondly the rate of descent of the rotorcraft is greater than a second threshold. In contrast, that system and that method operate only when the rotorcraft is operating in a tail wind condition.

Also known is Document FR 2 921 635, which describes a method and a device for detecting that a rotorcraft is entering into a vortex domain, or indeed in predictive manner, for detecting that a rotorcraft is approaching such a vortex domain. Such predictive detection is performed as a function of a predicted airspeed and of a predicted vertical speed of the rotorcraft that are determined in real time, and that are optionally calibrated.

Furthermore, Document EP 2 513 732 describes a system and a method for detecting whether an aircraft is close to or indeed in an aerodynamic stall situation, and then for engaging an automatic procedure for avoiding entry into a dangerous situation or indeed for escaping from it. Such a situation is detected by comparing an error threshold with a vertical speed error between the current vertical speed and the intended vertical speed, and by verifying the sign of the error. The vertical acceleration and the forward speed of the aircraft can also be compared with respective thresholds for verifying whether the aircraft has exited the stall situation.

Also known is Document WO 2012/007157, which describes a method based on detecting an absence of correlation between the flight-control signals of the rotorcraft and its vertical behavior in order to estimate the approach to a vortex-ring state.

In addition, Document US 2011/0295568 describes a method of determining changes in the geometry of the vortex-ring state caused by the blades of the main rotor of a rotorcraft, depending on the vertical induced speed by the main rotor and on the distribution of lift from the blades of the main rotor.

Furthermore, Document FR 2 978 586 is known, which describes a method and a device for assisting piloting onboard a hybrid aircraft having both a main rotor and also at least one propulsive propeller. That method makes it possible to define a minimum slope that the aircraft can follow in descent as a function of a thrust margin for each propulsive propeller. That minimum slope may be used in particular in order to avoid the hybrid aircraft entering into a vortex domain.

Finally, Document WO 2004/101358 describes a flight control system for a rotorcraft that serves to avoid the appearance of a vortex-ring state. That flight control system acts on the collective and/or cyclic pitches of the blades of each main rotor, e.g. in oscillating manner, so as to generate disturbances on the blades, thereby avoiding the appearance of a vortex-ring state.

The technological background of the invention also includes the publications by Oliver Westbrook-Netherton of Jul. 21, 2015, "An investigation into predicting vortex-ring state in rotary aircraft", and by David J. Varnes, of September 1999, "Development of a helicopter vortex-ring state warning system through a moving map display computer".

It can be seen that the methods and devices of the prior art enabling the approach to a vortex domain to be detected make use mostly of speed thresholds obtained by flight testing and defining a relatively localized flight envelope corresponding to the probable appearance of a vortex-ring state. Those speed thresholds need to be determined for each type of rotorcraft, in particular depending on their dimensions and their weights, during flight testing and/or simulations.

Selecting those speed thresholds is essential in order to be able to detect the proximity of the vortex domain effectively, while avoiding untimely detections. Nevertheless, experimental conditions cannot cover exhaustively all of the conditions that might be encountered by rotorcraft, whether in terms of variants of the rotorcraft or in terms of weather conditions. Furthermore, those speed thresholds are prepared on a priority basis from purely vertical flight tests, after which they are extended to forward flight with a steep slope, e.g. by applying correcting coefficients.

In addition, during flight testing, the transition to a vortex domain is identified mainly a posteriori, in particular as a result of an increase in vibration and/or an increase in the speed of descent of the rotorcraft. A non-negligible length of time may thus elapse between the moment the rotorcraft enters into a vortex domain and the instant at which it is detected.

Specifically, with prior art methods and devices, the uncertainties or approximations associated with the rotorcraft models that are used, with weather conditions, and with detecting entry into the vortex domain during testing are cumulative, and they can lead to inaccuracies in determining the speed thresholds that are used, and thus in detecting the approach of a vortex domain.

BRIEF SUMMARY OF THE INVENTION

An object of the present invention is thus to provide a method and a system making it possible to anticipate the entry of a rotorcraft into a vortex domain and to alert the pilot of this risk while avoiding the above-mentioned limitations. Specifically, the system and the method of the invention do not have recourse to any speed thresholds. The method and the system of the invention make use directly of the dynamics of the wake from the main rotor of the rotorcraft, and more precisely of variation in the flow of air in the environment of the main rotor, or else its effects on the rotorcraft. Consequently, the present invention is advantageously applicable to any rotorcraft without requiring prior testing specific to each category of rotorcraft.

Furthermore, the method and the system of the invention operate regardless of the stage of flight of the rotorcraft, equally well during pure vertical descending flight, during descending flight at a steep slope, and also in the proximity of hovering flight, and regardless of the wind conditions in which the rotorcraft is operating.

The method of the invention for anticipating entry of a rotorcraft into a vortex domain is for use by a rotorcraft having in particular a main rotor with blades. The method comprises the following steps:

a) acquiring measurements of at least one parameter suitable for characterizing variation in the flow of air in the environment of the main rotor;

b) analyzing the measurements in order to isolate frequencies that are characteristic of the variation of each parameter; and c) detecting a specific frequency f characterizing the proximity of a vortex domain.

During tests performed on a rotorcraft in flight, and also on models in a laboratory, it has been observed that in the presence of a vortex-ring state, there appears a phenomenon of vortex rings relaxing. This relaxation of vortex rings is a phenomenon that is periodic, since a vortex ring can contain only a finite quantity of energy. Specifically, the vortex ring that is characteristic of a vortex-ring state accumulates energy until it reaches a saturated state corresponding to a peak of the periodic relaxation phenomenon. Thereafter, the energy is released before a new relaxation cycle starts.

This periodic relaxation of the vortex ring is a phenomenon associated with the vortex ring becoming saturated, and it is characteristic of the variation in the wake left by the main rotor. Under such circumstances, the periodic relaxation of the vortex ring is directly associated with the presence of the vortex-ring state. This periodic relaxation of the vortex ring varies continuously and is therefore observable both when the rotorcraft is in a vortex domain and when the rotorcraft is approaching a vortex domain, i.e. before the vortex-ring state has any influence and dangerous effects on the flight of the rotorcraft. The amplitudes of this periodic relaxation are nevertheless lower in the proximity of a vortex domain than inside a vortex domain. In contrast, the periodic phenomenon disappears when the rotorcraft becomes far removed from the vortex domain.

This periodic relaxation of the vortex ring in a vortex domain or indeed in the proximity of such a vortex domain is a low frequency phenomenon. Specifically, it appears that the specific frequency f characterizing the periodic relaxation of the vortex ring is lower than 1 hertz (1 Hz).

As a general rule, a rotorcraft does not have any periodic phenomenon of its own at such a low frequency. For example, the frequency of rotation of the main rotor generally lies in the range 250 revolutions per minute (rpm) to 350 rpm, i.e. 4.17 Hz to 5.83 Hz, depending on the dimensions of the main rotor and of the rotorcraft. Under such circumstances, detecting a specific frequency f lower than 1 Hz in measurements of a parameter associated with the flow of air in the environment of the main rotor of the rotorcraft serves to detect the presence of periodic relaxation of the vortex ring, and thus the proximity of a vortex domain.

Under such circumstances, the method of the invention for anticipating entry into a vortex domain seeks to anticipate the approach of a vortex-ring state by observing the wake generated in flight by the main rotor and by detecting the presence of periodic relaxation of the vortex ring that is characteristic of the vortex-ring state.

As a result, after acquiring measurements of at least one parameter characterizing variation in the flow of air in the environment of the main rotor of the rotorcraft, modal analysis of those measurements serves to isolate frequencies that are characteristic of the variation of each parameter. Thereafter, detecting a specific frequency f among the characteristic frequencies that have been identified serves to establish the proximity of a vortex domain.

A parameter enabling variation in the flow of air in the environment of the main rotor of the rotorcraft to be characterized may be a parameter that characterizes the air flow directly, such as the pressure of the air, or indeed the speed of the air in the environment of the main rotor.

The pressure of the air serves to characterize this air flow and to reveal possible periodic saturation in this flow, i.e. a sign of the appearance of periodic relaxation of the vortex ring and thus of the proximity or indeed the presence of a vortex-ring state. This air pressure can be measured by a pressure sensor that is preferably positioned on the tail boom of the rotorcraft, under the tips of the blades of the main rotor. It is in the rear zone of the main rotor that a vortex-ring state appears initially.

The speed of the air also makes it possible to characterize this air flow, and consequently to detect the appearance of periodic relaxation of the vortex ring. An air speed vector characterized by a direction and an amplitude can be measured by an air speed indicator arranged on the rotorcraft, e.g. on the tail boom or indeed on the fuselage of the rotorcraft. This air speed vector is generally measured at the position of the air speed indicator, and specifically under the main rotor.

The air speed vector may also be measured remotely from the position of the air speed indicator. This applies for example using a light anemometer, such as a light detection and ranging (LIDAR) anemometer that serves to measure the air speed vector by sequentially transmitting and receiving a laser light beam. The air speed vector can then be measured directly at the location where the vortex ring appears, i.e. in the proximity of the tip of a blade, preferably the blade that is situated in the rear zone of the main rotor. By way of example, the measurement window for this air speed vector is situated above the tip of this blade and has as its minimum dimension a height that is equal to the radius of the blade and a width that is equal to half that radius.

A parameter suitable for characterizing variation in the flow of air in the environment of the main rotor may equally well be a parameter associated with the coupling between the main rotor and that flow of air. Specifically, changes and variations in this air flow as a result of the appearance or the proximity of a vortex-ring state can affect the characteristics of the rotorcraft and of its main rotor.

By way of example, this parameter may be the vertical acceleration of the rotorcraft relative to the surface, e.g. supplied by an inertial unit on board the rotorcraft, or else it may be the vertical speed of the rotorcraft. This parameter may also be the lift provided by the main rotor of the rotorcraft.

This parameter may also correspond to the forces exerted on the flight controls associated with the blades of the main rotor or indeed the forces needed to move those flight controls, in particular when the flight controls are directly connected with the blades of the main rotor.

While the measurements are being acquired, a single measured parameter may suffice to determine the approach of a vortex domain in anticipation.

Nevertheless, using at least two parameters can lead to better reliability in detecting the approach of a vortex domain so as to make it possible firstly to anticipate its appearance earlier and secondly to avoid falsely detecting a vortex domain when it is not certain that it is going to appear. By way of example, among these parameters, a first parameter may be directly associated with the flow of air, while a second parameter may be associated with its effects on the rotorcraft or on its main rotor.

It is also possible to couple the use of at least one parameter for characterizing variation in the flow of air in the environment of the main rotor as described above with speed thresholds that define a relatively localized flight envelope corresponding to it being probable that a vortex-ring state will appear, as defined in the prior art.

Furthermore, the looked-for frequencies are low frequencies, with the looked-for specific frequency f being lower than 1 Hz. Consequently, during acquisition, the use of a low acquisition frequency serves advantageously to filter out higher frequency signals that might disturb the measurement. Under such circumstances, the measurements are thus free at least of higher frequency signals as from acquisition, thereby facilitating subsequent analysis performed thereon.

Furthermore, the acquisition frequency must be compatible with the specific frequency f that is being looked for, i.e. it must be greater than the looked-for specific frequency f. The acquisition of measurements of at least one parameter is preferably performed at an acquisition frequency that is greater than or equal to twice the specific frequency f, in application of the Nyquist criterion. Specifically, since the looked-for specific frequency f is lower than 1 Hz, the acquisition frequency is advantageously higher than or equal to 2 Hz.

For example, the acquisition (a) of measurements of at least one parameter is performed at an acquisition frequency lying in the range twice to ten times the specific frequency f. Specifically, since the specific frequency f is lower than 1 Hz, the acquisition frequency advantageously lies in the range 2 Hz to 10 Hz.

When the measurements are acquired continuously, an intermediate step of sampling the measurement is performed between the acquisition step and the analysis step. This intermediate sampling step is performed at a sampling frequency equal to the above-mentioned acquisition frequency.

These measurements are acquired during an acquisition duration that is compatible with the looked-for specific frequency f. The acquisition duration is thus a function of the looked-for specific frequency f. This acquisition duration is preferably greater than or equal to twice the period corresponding to the specific frequency f. Specifically, since the looked-for specific frequency f is lower than 1 Hz, the acquisition duration is typically greater than 2 seconds (s).

For example, acquisition duration lies in the range twice to five times the period corresponding to the characteristic frequency f. Specifically, since the looked-for specific frequency f is lower than 1 Hz, the acquisition duration lies in the range 2 s to 5 s.

After the measurements have been acquired, analyzing them serves to isolate frequencies that are characteristic of the variation of each measured parameter, to identify its spectral components, and to estimate their amplitudes. By way of example, this analysis may be modal analysis involving application of the Fourier transform or any other method of modal analysis. The analysis serves to identify a fundamental frequency $f0$, and one or more associated characteristic frequencies, if any.

During this analysis, the measurements may be filtered and/or cleaned in known manner in order to eliminate any noise present in the measurements. For example, filtering may be performed by eliminating high frequencies above a predetermined amplitude threshold.

The method of the invention is for use during stages when there is a risk of the vortex domain appearing, i.e. during descending flight that is purely vertical, during descending flight at a steep slope, and in the proximity of hovering flight. Measurements are then acquired so long as the rotorcraft is operating in one of those risky stages of flight, possibly with a degree of overlap between two successive acquisitions.

After the measurements have been analyzed, a specific frequency f characterizing the proximity of a vortex domain, if any, may be detected among the characteristic frequencies identified for the variation of each measured parameter.

Under such circumstances, any characteristic frequency lower than 1 Hz may be considered as a specific frequency f characterizing the detection of periodic relaxation of a vortex ring that is characteristic of the vortex-ring state and thus of the proximity of a vortex domain.

Nevertheless, in order to take account of the possible presence of noise in the measurements, the specific frequency f is preferably detected when its amplitude is greater than a predetermined percentage of the amplitude of the fundamental frequency $f0$. As a result, the method of the invention serves to filter out noise from the measurements, thereby avoiding false detections of the proximity of a vortex domain. The predetermined percentage may be equal to 5% or 10%, for example.

After detecting a specific frequency f characterizing the proximity of a vortex domain, the method of the invention may include an additional step for signaling this detection to the crew of the rotorcraft and consisting in triggering (d) an alarm that a vortex domain is being approached as soon as a specific frequency f is detected.

This alarm may be signaled to the crew of the rotorcraft and in particular to the pilot in visual manner, e.g. by switching on a dedicated indicator lamp or by displaying a specific message on a display screen. The alarm may also be signaled audibly, e.g. by issuing a specific sound or by means of a recorded message.

Once the alarm has been triggered, the method of the invention continues to acquire measurements, to analyze them, and to detect a specific frequency f. As a result, the method continues to signal to the crew that the rotorcraft is close to the vortex domain so long as a specific frequency f is being detected. Thereafter, when a specific frequency f is no longer detected, the signaling of the alarm is stopped, thereby informing the crew that the rotorcraft has moved far enough away from the vortex domain.

In addition, the method of the invention can make use of time delays between firstly detecting the specific frequency f characterizing the proximity of a vortex domain and triggering an alarm, and secondly between detecting no specific frequency f and stopping the alarm. These time delays serve to avoid untimely and successive triggering and stopping of the alarm.

For example, the alarm may be triggered to inform the pilot 1 s after detecting the specific frequency f, and the alarm may be stopped 3 s after no specific frequency f has been detected.

Furthermore, the method of the invention may include inhibit conditions for deactivating triggering of the alarm.

By way of example, a first inhibit condition corresponds to the rotorcraft operating at a height above the surface that is less than or equal to a limit height. This first inhibit condition characterizes a position of the rotorcraft close to the surface, e.g. corresponding to a stage of takeoff or landing. This position close to the surface may also correspond to an aborted landing stage. Furthermore, below this limit height, the rotorcraft is subjected to the ground effect, which can lead to low frequencies appearing that might be considered wrongly as characterizing the proximity of a vortex domain.

A second inhibit condition corresponds to a rotorcraft with at least two engines and after entering into an emergency mode of operation as a result of a failure of one of its engines for a length of time that is shorter than a predetermined duration.

These two inhibit conditions are characteristic of flight conditions that are particular, potentially emergencies, and that monopolize the full attention of the pilot. Adding the signaling of an alarm to a situation that is already complex could disturb the pilot in dealing with the situation without providing useful additional assistance. It is therefore preferable to avoid signaling the approach of a vortex domain. Furthermore, the rotorcraft is in a transient state, e.g. as a result of losing an engine, and that might explain why a vortex domain is being approached, however the rotorcraft pilot is then dealing with the situation in order to return to a stage of stable flight, thereby naturally moving away from the vortex domain. Signaling to the pilot that a vortex domain is approaching provides the pilot with no assistance in this context and on the contrary might disturb the pilot in carrying out the procedure that is to be applied.

By way of example, the limit height may lie in the range 20 feet (ft) to 100 ft, and the predetermined duration may be equal to 30 s. These values are generally independent of the rotorcraft family. This 30 s duration corresponds to the duration of the one-engine inoperative (OEI) emergency rating of rotorcraft, which value may vary as a function of the acceptable duration for this emergency rating.

Furthermore, in order to eliminate potential interfering low frequencies that might lead to erroneous detection of the proximity of a vortex domain, it is possible to estimate a value for the specific frequency f. Furthermore, uncertainty about this estimated value for the specific frequency f is taken into account when detecting the specific frequency f from among the identified characteristic frequencies.

Consequently, on detecting a specific frequency f characterizing the proximity of a vortex domain, only those characteristic frequencies that are situated in a particular range are detected for the purpose of anticipating an approach to a vortex domain. This particular range has bounds that are the estimated value of the specific frequency f respectively plus and minus the uncertainty. By way of example, this uncertainty may be equal to 5% or 10% of the estimated value of the specific frequency f.

Furthermore, this estimate of the specific frequency f also serves to optimize the acquisition frequency and the acquisition duration.

The specific frequency f may thus be estimated using the following relationship:

$$St = \frac{f \times \emptyset}{V}$$

St being the Strouhal number, Ø being the diameter of the main rotor, and V being the speed with which the rotorcraft is moving relative to the air. This speed of movement V of the rotorcraft should be understood in three dimensions and is the sum of the speed of advance plus the vertical speed of the rotorcraft.

The Strouhal number is a dimensionless number serving in particular to describe oscillating flow mechanisms of a mass of air. The Strouhal number is independent of the characteristics of the rotorcraft.

In the context of an approximation that is acceptable for application to the method of the invention, the Strouhal number St, which varies very little for ordinary objects such as disks, may be considered as being a constant regardless of the rotorcraft and regardless of its flying conditions. By way of example, the Strouhal number St may be considered to be equal to 0.16.

The Strouhal number St may also be determined as a function of the angle between the vector representing the speed of movement V of the rotorcraft relative to the air and a plane formed by the rotating main rotor. Specifically, the Strouhal number increases when the angle of the speed vector of the air relative to the plane of the main rotor increases.

Finally, in order to refine the detection of a vortex domain, the method of the invention may be coupled with conventional methods of detecting the approach of a vortex domain by comparing certain speeds of the rotorcraft with speed thresholds.

The invention also provides an anticipation system for anticipating entry of a rotorcraft into a vortex domain, the rotorcraft having a main rotor with blades. The anticipation system comprises:

at least one measurement device for measuring at least one parameter serving to characterize variation in the flow of air in the environment of the main rotor;

a storage device containing calculation instructions and capable of storing the measurements of each parameter;

a calculation device connected to each measurement device and to the storage device, the calculation device being for detecting that the rotorcraft is approaching a vortex domain; and a signaling device for signaling detection of the rotorcraft being in the proximity of a vortex domain, the signaling device being connected to the calculation device.

By way of example, the measurement device may be a pressure sensor, an airspeed indicator, or indeed an inertial unit. By way of example, the calculation device may be a computer and the signaling device may, for example, be an indicator lamp, a display screen on which an alarm message is displayed, or indeed a loudspeaker.

The anticipation system is configured to perform the above-described method of anticipating entry into a vortex domain in order to determine whether a rotorcraft is approaching a vortex domain.

BRIEF DESCRIPTION OF THE DRAWINGS

The invention and its advantages appear in greater detail from the context of the following description of preferred implementations given without any limiting character and with reference to the accompanying figures, in which.

Elements present in more than one of the figures are given the same references in each of them.

DETAILED DESCRIPTION OF THE INVENTION

Figure 1:
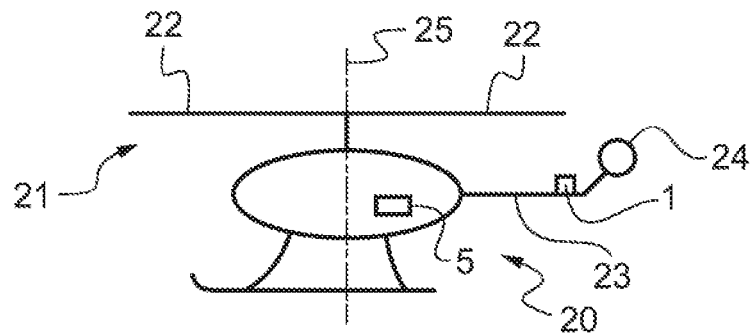
FIG. 1 shows a rotorcraft.

In FIG. 1, a rotorcraft 20 has a main rotor 21 with blades 22 rotating about an axis 25, together with a tail boom 23 with an anti-torque tail rotor 24 being arranged at its end. The rotorcraft 20 also has an inertial unit 5 capable of providing flight information such as the accelerations of the rotorcraft 20 relative to the surface.

Figure 2:
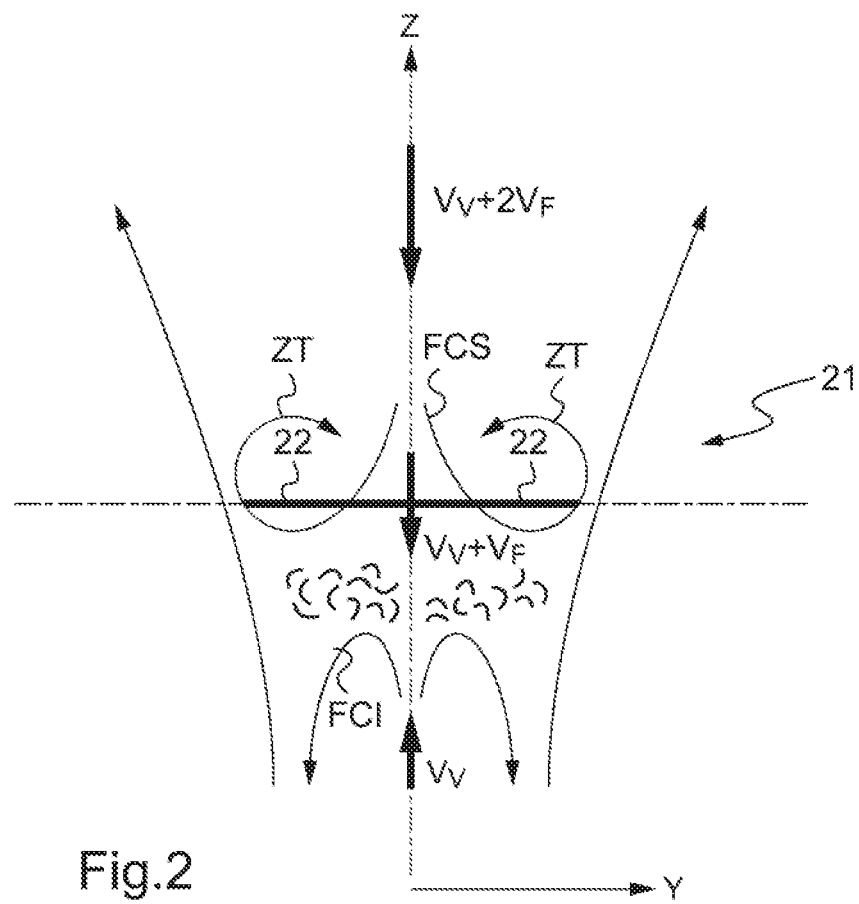
FIG. 2 shows the flow of air around a main rotor of a rotorcraft in a vortex domain.

FIG. 2 shows the main rotor 21 operating in a vortex domain. The directions of the air flow speeds shown in FIG. 2 correspond to the rotorcraft 20 performing slowly-descending vertical flight.

The speed Vv is the vertical component of the upstream speed of the air flow, normal to the plane formed by the main rotor 21, and the value $V_F$, referred to as the "Froude speed" by the person skilled in the art is, in this situation, greater than the speed Vv. It can be seen that a wake forms at the bottom portion of the main rotor 21, thereby constraining the top central air streams FCS to create a vortex zone ZT towards the periphery of the blades 22.

Under such conditions, a vortex-ring phenomenon, which is revealed in particular by vibration that is felt by the crew of the rotorcraft 20, begins when the rotorcraft 20 starts purely vertical descent or indeed descent with a steep slope, the main rotor 21 then descending through its own wake and losing lift because it is isolated from the air flow. If no correcting maneuver is undertaken by the pilot of the rotorcraft 20, the rotorcraft 20 will then drop suddenly.

In order to avoid such a dangerous situation, which is specific to rotorcraft, the rotorcraft 20 includes an anticipating system 10 for anticipating entry into a vortex domain. The anticipating system 10 serves to perform a method of anticipating entry by the rotorcraft 20 into a vortex domain, which method is summarized by the diagram shown in FIG. 4.

The system 10 can thus detect that the rotorcraft 20 is approaching a vortex domain, and then inform the pilot of the rotorcraft 20 in predictive manner. Under such circumstances, the pilot can take the necessary measures by taking action in anticipation of this approach, thereby avoiding the rotorcraft 20 entering into the vortex domain.

Figure 3:
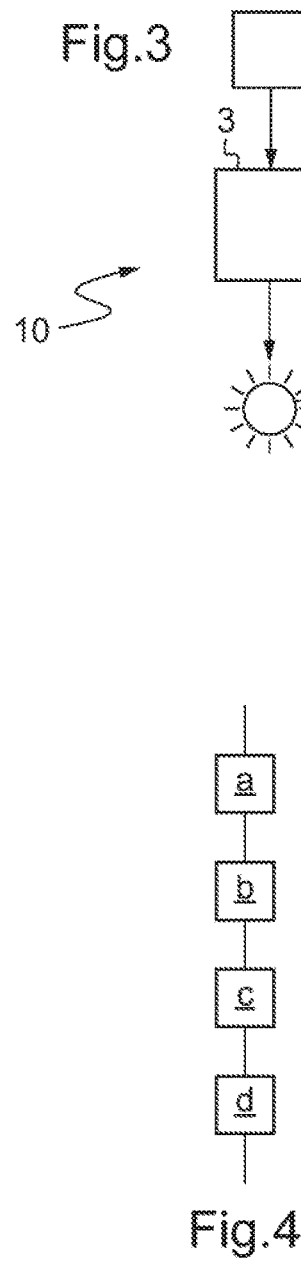
FIG. 3 shows a system for anticipating entry of a rotorcraft into a vortex domain.

The system 10 is shown in FIG. 3, and comprises:

a measurement device 1 for measuring a parameter for characterizing variation in the flow of air in the environment of the main rotor 21;

a storage device 2 for storing air pressure measurements acquired by the measurement device 1, and also instructions needed to perform the method;

a calculation device 3 connected to the measurement device and to the storage device 2, for the purpose of applying the instructions and thereby detecting that the rotorcraft 20 is approaching a vortex domain; and a signaling device 4 for signaling to the pilot of the rotorcraft 20 that the rotorcraft 20 is in the proximity of a vortex domain, the signaling device 4 being connected to the calculation device 3.

The measurement device 1 is a pressure sensor positioned on the tail boom 23 level with the ends of the blades 22 of the main rotor 21. The pressure sensor thus serves to measure the pressure of the air in the wake of the main rotor 21.

The calculation device 3 is a computer and the signaling device 4 is an indicator lamp situated on the instrument panel of the rotorcraft 20.

Figure 4:
FIG. 4 is a block diagram of a method of anticipating entry of a rotorcraft into a vortex domain.

The method of anticipating entry by a rotorcraft 20 into a vortex domain comprises four steps, as shown in FIG. 4.

Firstly, measurements are acquired of a parameter characterizing variation in the flow of air in the environment of the main rotor 21 of the rotorcraft 20. This acquisition (a) is performed by means of the measurement device 1, and this parameter is thus the pressure of the air situated between the rear zone of the main rotor 21 and the tail boom 23.

This parameter may also be a parameter associated with the coupling between the main rotor 21 and the flow of air in the environment of the main rotor 21. Specifically, variation in this air flow as a result of a vortex-ring state appearing or being close, can affect the characteristics of the rotorcraft 20 and of its main rotor 21. By way of example, this parameter may be the vertical acceleration of the rotorcraft 20 relative to the surface, as supplied by the inertial unit 5.

Figure 5:
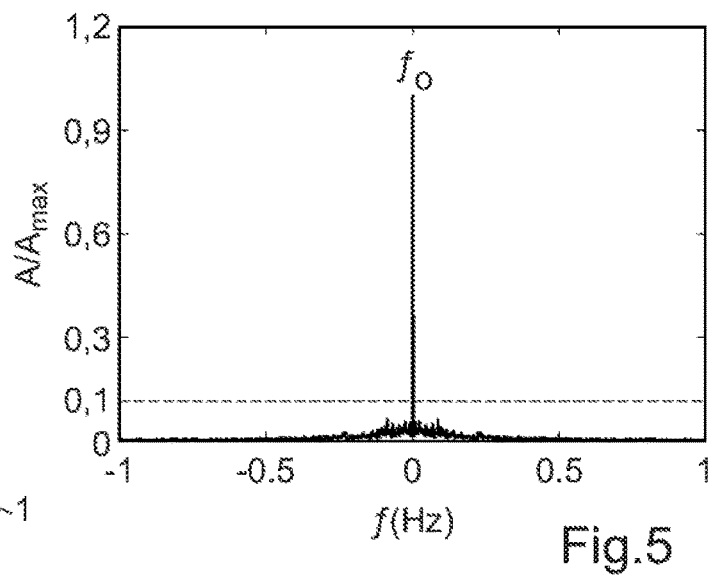
FIGS. 5 to 7 are three plots showing modal analysis of air flow measurements.
Figure 6:
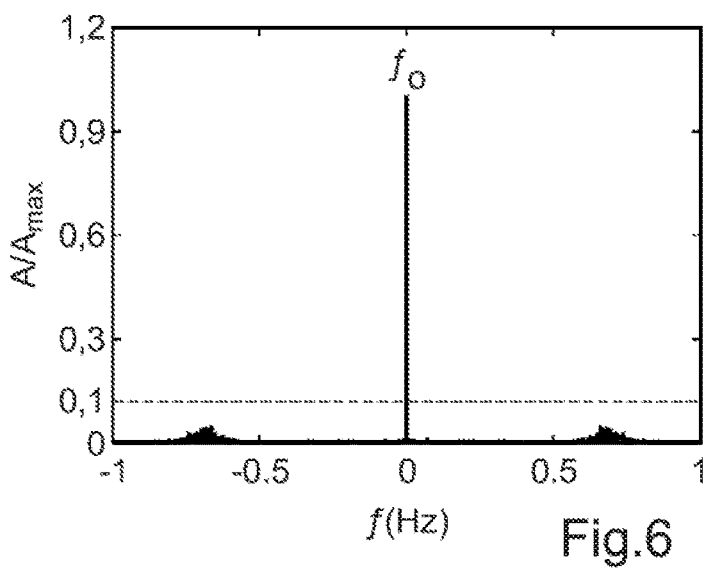
Figure 7:
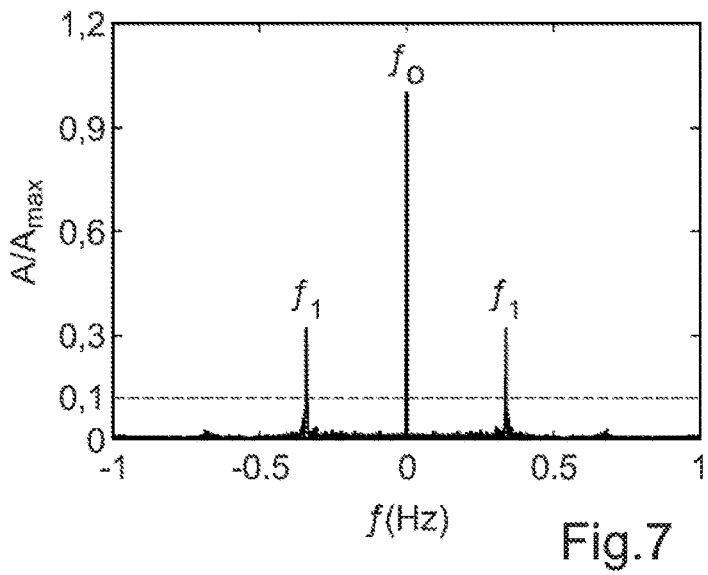

Thereafter, the acquired measurements are analyzed. This analysis (b) may for rotorcraft be modal analysis serving to isolate characteristic frequencies of the variation in this parameter. The results of this analysis in three flight situations of the rotorcraft 20 are shown in the form of respective "symmetrical spectrum" plots in FIGS. 5 to 7. FIG. 5 shows the situation of a rotorcraft in substantially vertical flight descending at a very low rate, FIG. 6 shows the situation of a rotorcraft in autorotation flight, and FIG. 7 shows the situation of a rotorcraft operating in a vortex domain.

In each situation, a central fundamental frequency f0 can be present. The results are displayed for frequencies lower than 1 Hz and the amplitudes of this spectrum plot are normalized on the amplitude $A_{max}$ at the fundamental frequency f0.

For the situations of substantially vertical flight at a very low descent rate and for autorotation flight, there can be seen, apart from the fundamental frequency f0, only the presence of frequencies at very low amplitudes corresponding to the noise associated with the measurements. The amplitude A of this noise is well below 10% of the amplitude $A_{max}$ at the fundamental frequency f0, as shown in FIGS. 5 and 6. No frequency characteristic of variation in the measured parameter has thus been identified in either of these two situations.

For a rotorcraft operating in a vortex domain, in addition to the fundamental frequency f0 and frequencies at very low amplitudes corresponding to the noise associated with the measurements, there can be seen the presence of two significant frequencies $f_1$ of amplitude A greater than 10% of the amplitude $A_{max}$ at the fundamental frequency f0. Since the plot is symmetrical, this analysis of the acquired measurements thus serves to identify a characteristic frequency $f_1$ for the variation in the measured parameter in a frequency range of lower than 1 Hz.

Consequently, a specific frequency f among the identified characteristic frequencies is detected in order to anticipate possible entry of the rotorcraft 20 into a vortex domain.

As a result of various tests carried out both on a rotorcraft in flight and on models in a laboratory, it has been observed that a vortex-ring state is accompanied by the appearance of a phenomenon of periodic relaxation of the vortex ring of this state. This periodic relaxation of the vortex ring can be characterized in particular by such a specific frequency f.

Such detection (c) of a specific frequency f thus seeks to verify whether this specific frequency f that is characteristic of the presence of periodic relaxation of the vortex ring and thus of the presence or the proximity of a vortex ring stage is to be found among the characteristic frequencies identified during the analysis of the acquired measurement.

The tests that have been undertaken have revealed that the specific frequency f characterizing this periodic relaxation of the vortex ring is lower than 1 Hz. Furthermore, a rotorcraft generally does not have any periodic phenomenon of its own at such a low frequency lower than 1 Hz, in particular during the stages of flight that are concerned by the risk of a vortex-ring state appearing.

Consequently, detection of the characteristic frequency $f_1$ lower than 1 Hz in a rotorcraft operating in a vortex domain can be considered as detecting a specific frequency f characterizing periodic relaxation of a vortex ring that is characteristic of the vortex-ring state. The method of anticipating entry into a vortex zone thus confirms that the rotorcraft 20 is operating in a vortex domain.

Likewise, in the other two situations, detecting no characteristic frequency lower than 1 Hz confirms that the rotorcraft 20 is not operating in a vortex domain.

Nevertheless, as can be seen from the plots shown in FIGS. 5 to 7, noise is present and may potentially disturb detecting the specific frequency f. Under such circumstances, in order to eliminate that noise and thus avoid false detections of the proximity of a vortex domain, the specific frequency f is detected when its amplitude A is greater than a predetermined percentage of the amplitude $A_{max}$ that the fundamental frequency f0. The predetermined percentage is equal to 10% in the plots shown in FIGS. 5 to 7.

Furthermore, on detection (c) of a specific frequency f, an accurately defined specific frequency f may be searched for in order to refine the detection of a vortex domain and eliminate possible low frequency interference. This specific frequency f may be defined by calculation, in particular depending on the dimensions of the main rotor 21 and the speed at which the rotorcraft 20 is moving through the air. An uncertainty range around this accurately defined specific frequency f is taken into account in order to detect a characteristic frequency that corresponds to the presence or else to the proximity of a vortex domain.

After a specific frequency f characterizing the proximity of a vortex domain has been detected among the characteristic frequencies identified during analysis of the measurements, an alarm indicating approach to a vortex domain is triggered (d). This alarm is signaled by switching on the signaling device 4. The pilot of the rotorcraft 20 is then informed that a vortex domain is close and can then carry out the maneuvers that are necessary in order to avoid the rotorcraft 20 actually entering into the vortex domain.

The alarm is signaled so long as a specific frequency f is detected. The signaling device 4 is then switched off as soon as no specific frequency f is detected by the method of anticipating entry into a vortex domain in order to inform the crew that the rotorcraft is far away enough from the vortex domain.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of anticipating the entry of a rotorcraft into a vortex domain, the rotorcraft having a main rotor with blades, wherein the method comprises the following steps:
   a) acquiring measurements of at least one parameter suitable for characterizing variation in the flow of air in the environment of the main rotor;
   b) analyzing the measurements in order to isolate frequencies that are characteristic of the variation of each parameter; and
   c) detecting a specific frequency f characterizing the proximity of a vortex domain, the specific frequency being lower than 1 Hz.

2. The method according to claim 1, wherein the specific frequency f is estimated using the following relationship:

$$St = \frac{f \times \emptyset}{V}$$

where St is the Strouhal number, ø is the diameter of the main rotor, and V is the speed the rotorcraft is moving relative to the air.

3. The method according to claim 2, wherein the Strouhal number St is considered as being a constant.

4. The method according to claim 2, wherein the Strouhal number St is determined as a function of the angle between a vector representing the speed with which the rotorcraft is moving relative to the air and a plane formed by the rotating main rotor.

5. The method according to claim 1, wherein the specific frequency f is detected when its amplitude is greater than a predetermined percentage of the amplitude of a fundamental frequency of the variation of the parameter.

6. The method according to claim 5, wherein the predetermined percentage is equal to 10%.

7. The method according to claim 1, wherein the acquisition of measurements of at least one parameter is performed at an acquisition frequency that is greater than or equal to twice the specific frequency f.

8. The method according to claim 7, wherein the acquisition of measurements of at least one parameter is performed at an acquisition frequency lying in the range twice to ten times the specific frequency f.

9. The method according to claim 1, wherein the acquisition of measurements of at least one parameter is performed over an acquisition duration that is greater than or equal to twice a period corresponding to the specific frequency f.

10. The method according to claim 9, wherein the acquisition of measurements of at least one parameter is performed for an acquisition duration lying in the range twice to five times the period corresponding to the characteristic frequency f of a vortex domain.

11. The method according to claim 1, wherein during the acquisition of measurements, only one parameter is measured.

12. The method according to claim 1, wherein each parameter measured during the acquisition of measurements is selected from a list comprising a vertical acceleration of the rotorcraft relative to the surface, an air speed in the environment of the main rotor, a pressure of the air in the environment of the main rotor, forces exerted in the flight controls associated with the blades of the main rotor, and lift of the main rotor.

13. The method according to claim 1, wherein the method includes an additional step of triggering an alarm indicating that a rotorcraft is approaching a vortex domain as soon as the specific frequency f is detected.

14. An anticipating system for anticipating entry of a rotorcraft into a vortex domain, the rotorcraft having a main rotor with blades, and the system comprising:
   at least one measurement device for measuring at least one parameter serving to characterize variation in the flow of air in the environment of the main rotor;
   a storage device containing calculation instructions and capable of storing the measurements of each parameter;
   a calculation device connected to each measurement device and to the storage device, the calculation device being for detecting that the rotorcraft is approaching a vortex domain; and
   a signaling device for signaling detection of the rotorcraft being in the proximity of a vortex domain, the signaling device being connected to the calculation device;
   wherein the system is configured to perform the following steps:
   a) acquiring measurements of the at least one parameter serving to characterize variation in the flow of air in the environment of the main rotor;
   b) analyzing the measurements in order to isolate frequencies that are characteristic of the variation of each parameter; and
   c) detecting a specific frequency f characterizing the proximity of a vortex domain, the specific frequency being lower than 1 Hz.

15. The system according to claim 14, wherein the specific frequency f is estimated using the following relationship:

$$St = \frac{f \times \emptyset}{V}$$

where St is the Strouhal number, ø is the diameter of the main rotor, and V is the speed the rotorcraft is moving relative to the air.

16. The system according to claim 14, wherein the specific frequency f is detected when its amplitude is greater than a predetermined percentage of the amplitude of a fundamental frequency of the variation of the parameter.

17. The system according to claim 14, wherein the acquisition of measurements of at least one parameter is performed at an acquisition frequency that is greater than or equal to twice the specific frequency f.

18. The system according to claim 14, wherein the acquisition of measurements of at least one parameter is performed over an acquisition duration that is greater than or equal to twice a period corresponding to the specific frequency f.

19. The system according to claim 14, wherein each parameter measured during the acquisition of measurements is selected from a list comprising a vertical acceleration of the rotorcraft relative to the surface, an air speed in the environment of the main rotor, a pressure of the air in the environment of the main rotor, forces exerted in the flight controls associated with the blades of the main rotor, and lift of the main rotor.

20. The system according to claim 14, wherein the system is configured to perform an additional step of triggering an alarm indicating that a rotorcraft is approaching a vortex domain as soon as the specific frequency f is detected.

* * * * *